(12) United States Patent
Chvala et al.

(10) Patent No.: US 11,109,565 B2
(45) Date of Patent: Sep. 7, 2021

(54) HAY BALE CRADLE

(71) Applicants: Natalie Chvala, Swanton, OH (US); Thomas Louy, Delta, OH (US)

(72) Inventors: Natalie Chvala, Swanton, OH (US); Thomas Louy, Delta, OH (US)

( * ) Notice: Subject to any disclaimer, the term of this patent is extended or adjusted under 35 U.S.C. 154(b) by 26 days.

(21) Appl. No.: 16/550,717

(22) Filed: Aug. 26, 2019

(65) Prior Publication Data

US 2020/0068806 A1 Mar. 5, 2020

Related U.S. Application Data

(60) Provisional application No. 62/723,652, filed on Aug. 28, 2018.

(51) Int. Cl.
*A01K 1/10* (2006.01)
*A01D 90/00* (2006.01)

(52) U.S. Cl.
CPC ............... *A01K 1/10* (2013.01); *A01D 90/00* (2013.01)

(58) Field of Classification Search
CPC . A01D 90/00; A01K 1/10; A01K 5/01; A01K 39/014; B60P 1/165; B60P 1/28; B61D 9/02; A63H 17/06; B65G 7/08; B65G 65/24; Y10S 119/90
See application file for complete search history.

(56) References Cited

U.S. PATENT DOCUMENTS

| | | | | | |
|---|---|---|---|---|---|
| 457,784 | A | * | 8/1891 | Lapham | A01K 1/10 119/60 |
| 561,631 | A | * | 6/1896 | Wadley | B65H 31/3027 414/789.9 |
| 3,086,666 | A | * | 4/1963 | Larson | B60P 3/41 414/559 |
| 3,802,394 | A | * | 4/1974 | Mahler | A01K 1/10 119/51.5 |
| 3,922,036 | A | * | 11/1975 | Kalsbeck | A01D 90/083 298/18 |
| 4,044,907 | A | * | 8/1977 | Craft | A01D 87/127 414/24.5 |
| 4,124,126 | A | * | 11/1978 | Abraham | B22C 17/08 164/224 |
| 4,580,843 | A | * | 4/1986 | Lund | A01D 90/083 105/239 |
| 5,000,122 | A | * | 3/1991 | Smith | A01K 1/10 119/58 |
| 5,030,053 | A | * | 7/1991 | Wickizer | A01D 87/127 414/24.5 |
| 5,123,800 | A | * | 6/1992 | Druse, Sr. | B60P 1/24 298/17.6 |

(Continued)

*Primary Examiner* — Gregory W Adams
(74) *Attorney, Agent, or Firm* — Schaffer, Schaubb & Marriott, Ltd.

(57) ABSTRACT

This manger style hay bale handling apparatus comprises a manger shell structure positioned within a structural frame and pivotably mounted to the structural frame and moveable between a first bale retaining position and a second bale retaining position; and wherein the manger shell structure comprises a plurality of curved shaped ribs being spaced apart to form a cradle framework providing longitudinal support for a horizontally positioned round hay bale. Rotatable locking mechanisms rotate the manger shell structure between positions.

8 Claims, 5 Drawing Sheets

(56) References Cited

U.S. PATENT DOCUMENTS

| | | | | |
|---|---|---|---|---|
| 5,137,412 A | * | 8/1992 | McAdams | A01D 90/083 |
| | | | | 298/17.6 |
| 5,311,840 A | | 5/1994 | Rumbaugh | |
| 5,320,477 A | | 6/1994 | Druse, Sr. | |
| 5,496,145 A | * | 3/1996 | Monin | A01K 5/01 |
| | | | | 119/59 |
| D371,228 S | | 6/1996 | Monin | |
| 5,743,211 A | * | 4/1998 | Schoessow | A01K 5/01 |
| | | | | 119/58 |
| 6,006,696 A | | 12/1999 | Mann et al. | |
| 6,106,072 A | * | 8/2000 | Lutter, Jr. | B60P 1/165 |
| | | | | 298/17.5 |
| 6,478,522 B2 | | 11/2002 | Babb | |
| 6,789,504 B1 | * | 9/2004 | O'Neill | A01K 1/10 |
| | | | | 119/58 |
| D548,896 S | * | 8/2007 | Stewart | D30/131 |
| 8,181,600 B2 | * | 5/2012 | Smith | A01K 5/0107 |
| | | | | 119/60 |
| 9,345,229 B2 | * | 5/2016 | Gibbons | A01K 1/10 |
| 9,470,108 B2 | * | 10/2016 | Jacobs | B64F 5/50 |

* cited by examiner

HAY BALE CRADLE

CROSS REFERENCE TO RELATED APPLICATION

The present patent application is based upon and claims the benefit of provisional patent application No. 62/723,652 filed on Aug. 28, 2018.

TECHNICAL FIELD

This invention relates round hay bale cradles specifically designed for ease of loading. A person can roll the round bale into the feeder without the use of any equipment.

BACKGROUND OF THE INVENTION

Round hay bales are a convenient and economical feeding option for farmers' and livestock/horse owners. They provide constant food for the natural grazing animals, which is essential for healthy stomach functions and therefore healthy animals. However, many people opt to purchase the more expensive square bales because the round bales have some major downfalls, even when using a round hay bale feeder.

Often, prior art round bale feeders have a stationary frame design that requires heavy equipment to load the hay by either lifting up over the side rail and into the container or by spearing through the center of the bale to load through a removable side gate.

BRIEF SUMMARY OF THE INVENTION

This apparatus is specifically designed for ease of loading. A person can roll the round bale into the feeder without the use of any machinery. Many horse or livestock owners do not have heavy equipment at their disposal, especially the smaller farms and recreational horse owners. Therefore, this design is ideal for both the large-scale farmers and backyard horse owners alike. With the prior art, the hay would need to be lifted with some form of tractor or other machinery to be loaded into the feeder. They are stationary with no moving parts to assist in loading the hay. Whereas, the main design point of this invention is the feeder's ability to tilt in order to manually load. This is a main difference between the designs. The older designs require the round bale to be lifted. Whether it would need to be lifted over a side rail in order to put it in the cradle or speared through the middle and lifted and slid in from a removable end gate. With the inventive design there is no need to lift the bale at all. It is rolled into the tilted cradle allowing the operator to rotate the cradle into the upright locking position.

DETAILED DESCRIPTION OF THE INVENTION

This cradle style hay bale retaining apparatus comprises a manger shell structure positioned within a structural frame and pivotably mounted to the structural frame and moveable between a first bale retaining position and a second bale retaining position; and wherein the manger shell structure comprises a plurality of curved shaped ribs being spaced apart to form a cradle framework providing longitudinal support for a horizontally positioned round hay bale.

Round hay bales are a convenient and economical feeding option for farmers and livestock/horse owners. They provide constant food for the natural grazing animals, which is essential for healthy stomach functions and therefore healthy animals. However, many people opt to purchase the more expensive square bales because the round bales have some major downfalls, even when using a round hay bale feeder.

The apparatus has a mounting platform for elevating the manger shell above ground wherein the mounting platform comprises a pair of parallel spaced apart skids. The mounting platform further comprises a cross member connected to the parallel spaced apart skids. The cross member is perpendicular to the parallel, spaced apart skids. In one embodiment, the cross member is rotatably connected to the manger shell. The fixture is permanently affixed to the cradle framework of the manger shell.

In one embodiment, the skids are longitudinal bars. In another embodiment, the skids are elongated rods.

In another preferred embodiment, the sides of the hay cradle have a taller arch, to prevent the horses from pulling the center of the bale out. Unanticipated behavior. The locking mechanism is a metal bar that spans from one base to the other on both sides of the cradle. When the cradle is in the upright, locked position, the bar sits in a notch on the top of the base. The cradle is "cradled" between the bars. To load a bale, a user will flip the bar forward to allow the cradle to rock forward. Then roll the bale on and flip the bar back over the top of the base into its notch. This results in a loaded hay cradle. The weight is better distributed with this locking mechanism.

Figure 1:
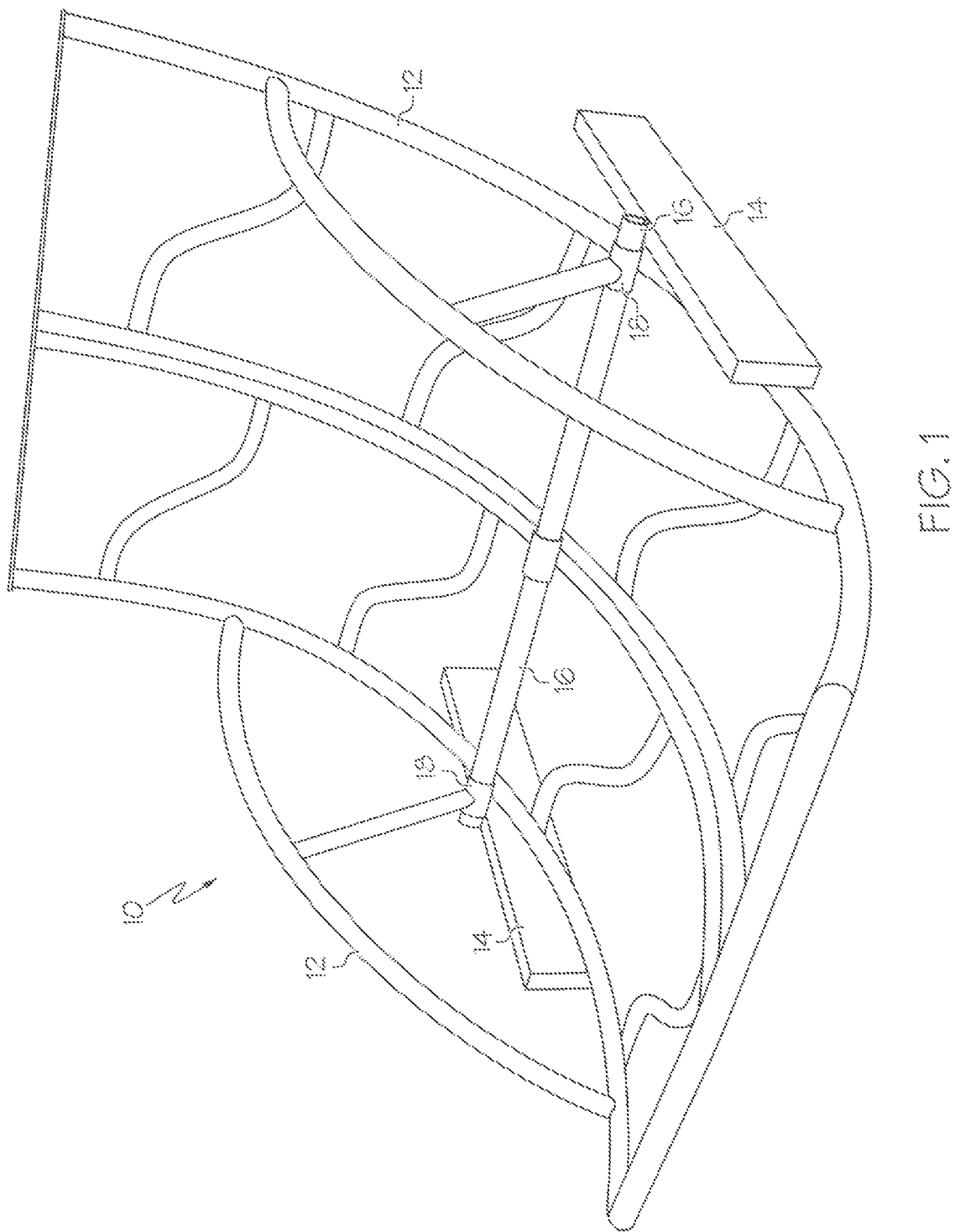
FIG. 1 shows a manger style hay bale cradle of this invention.

FIG. 1 shoes a manger style hay bale cradle of this invention. Manger style hay bale cradle 10 comprises structured frame 12 movable between a first bale retaining position and a second bale retaining position. A mounted platform comprises a pair of parallel spaced apart skids 14 and cross member 16 connected to parallel spaced apart skids 14. Cross member 16 is perpendicular to parallel, spaced apart skids 14.

Cross member 16 is rotatably connected to manger shell 10 with fixture 18 that allows manger shell 10 to rotate. Fixture 18 is permanently affixed to the cradle framework of claim shell 10. Skids 14 may be longitudinal bars or elongated rods.

Figure 2:
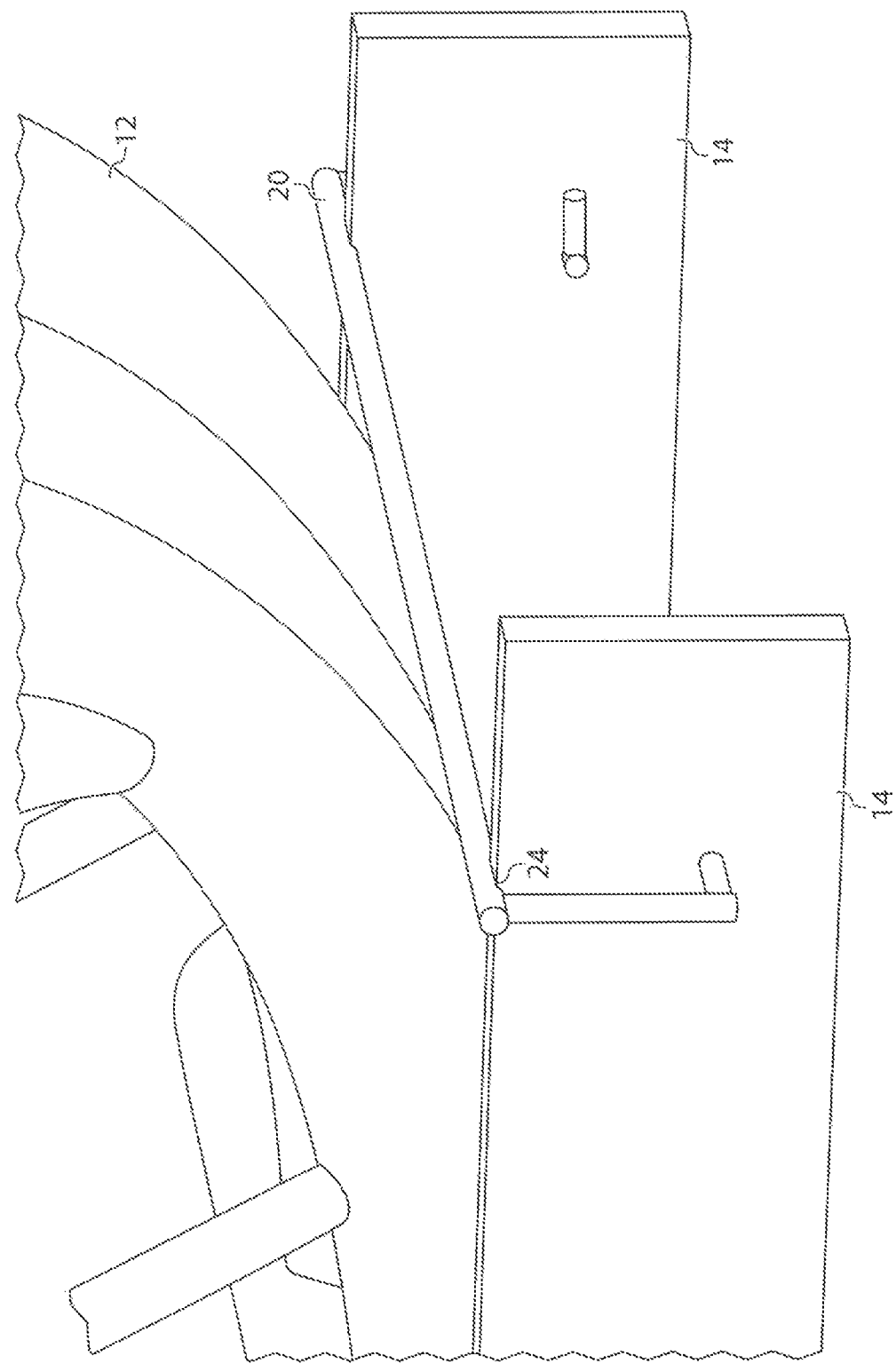
FIG. 2 is a fragmentary view of a hay bale cradle with a preferred locking mechanism in the unlocked positioned.

FIG. 2 is a fragmentary view of a hay bale cradle with a preferred locking mechanism in the unlocked position. FIG. 2 shows structured frame 12, skids 14, and locking bar 20 in the unlocked position. When cradle 10 is in the upright locked position, bar 20 sits in a notch on the top of skid 14. The cradle is "cradled" between two bars. To load a bale, a user just flip bar 20 forward to allow cradle 10 to rock forward.

Figure 3:
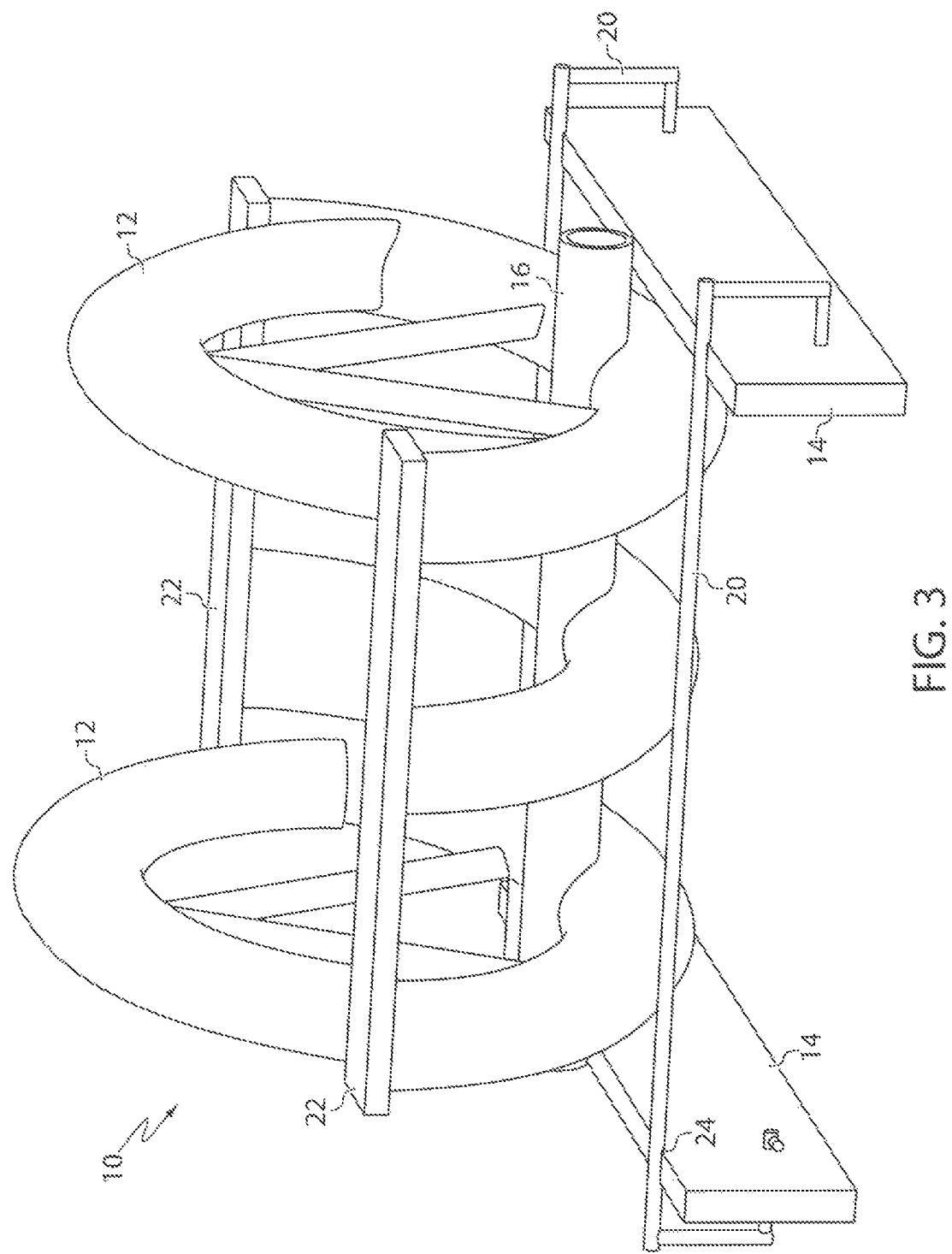
FIG. 3 shows a hay bale cradle with a preferred locking mechanism in the unlocked position.

FIG. 3 shows a hay bale cradle with a preferred locking mechanism in the unlocked position. Locking mechanism 22 is above bar 20. Sides 12 have a taller arch than sides 12 in FIG. 1. Locking mechanism 22 is now a metal bar that spans from one skid 14 to the other on both sides of cradle 10. When cradle 10 is in the upright locked position bar 20 sits in a notch on the top of skid 14. The cradle is "cradled" between the bars. To load a bale, a user flips the bar forward to allow the cradle to rock forward. Then roll the bale on and flip the bar back over the top of the base into its notch. This results in a loaded hay cradle. The weight is better distributed with this locking mechanism.

Figure 4:
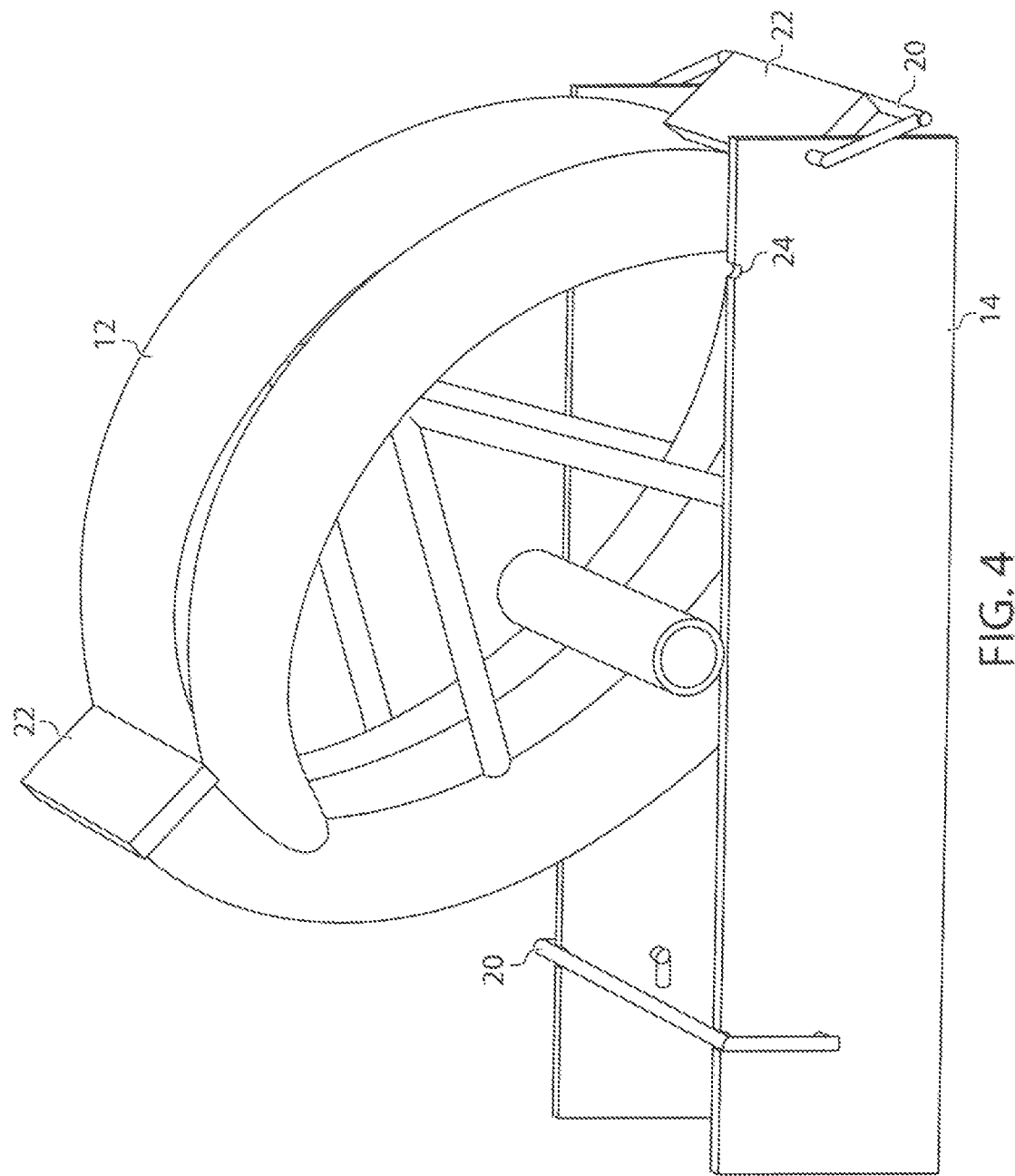
FIG. 4 shows a hay bale cradle with a preferred locking mechanism in the locked position.

FIG. 4 shows a hay bale cradle with a preferred locking mechanism in the locked position. Mechanism 22 is above bar 20 and hold bar 20 in a locked position. As a result, cradle 10 is rocked forward and a hay bale may be loaded onto cradle 10.

Figure 5:
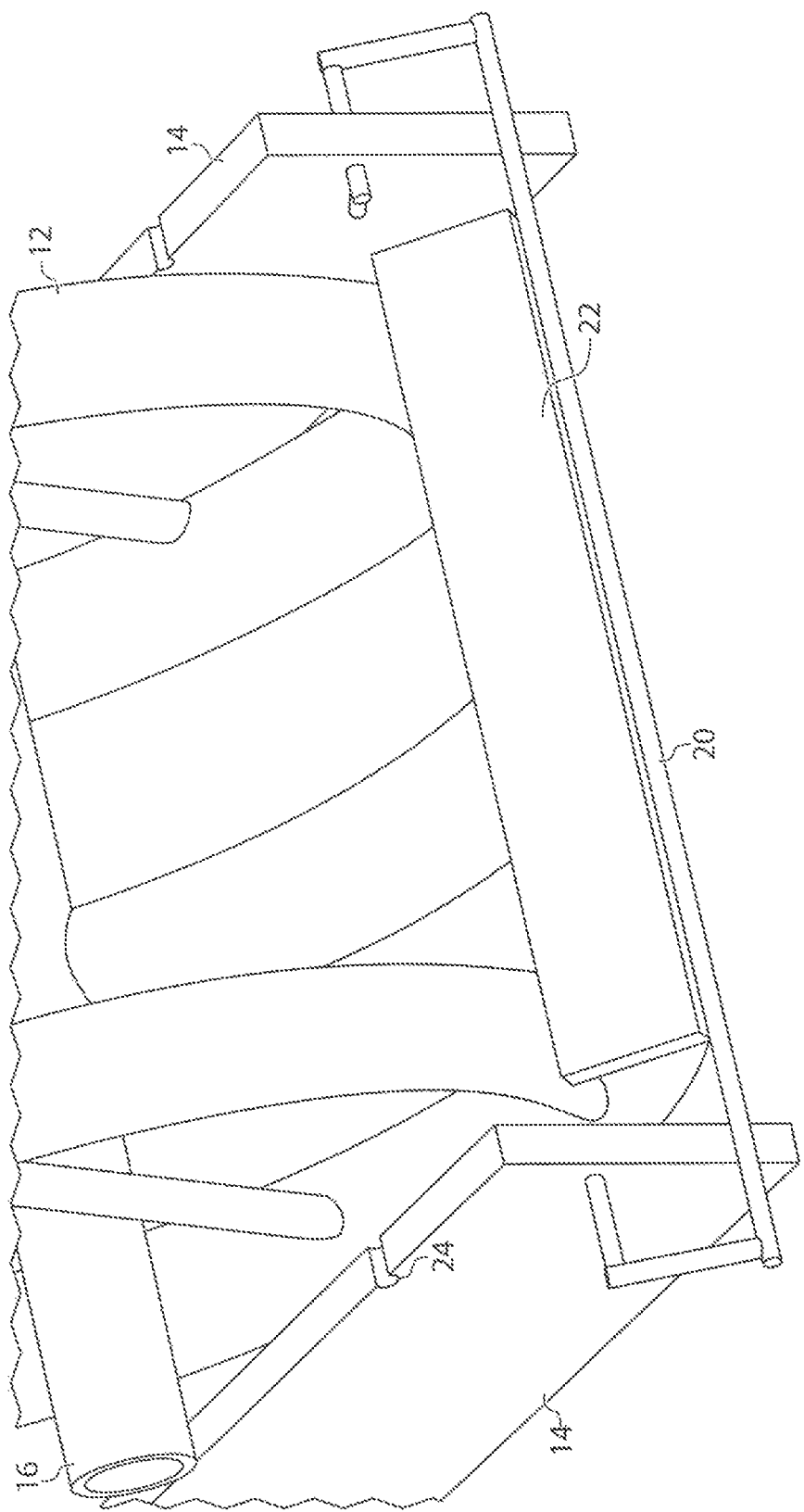
FIG. 5 shows a fragmentary hay bale cradle with a preferred locking mechanism in the locked position.

FIG. 5 is a fragmentary view showing a hay bale cradle with a preferred locking mechanism in the locked position. Once a hay bale is loaded into cradle 10, bar 20 may be flipped over the top of mechanism 22. Hay cradle 10 then is loaded. Weight is better distributed with this locking mechanism.

The following shoes the advantages of the invention.

Problem:
- 30%+hay waste—the animals step down the round bale as they feed, and the residual hay is then ground under foot and becomes contaminated by feces and inedible.
- Rodent infestation—the wasted ay then becomes prime habitat for snakes, rats, mice, possum, and other unwanted creatures. The feces in the hay from these animals creates health risks, and the rodent's dens and tunnels present trip hazards which can potentially break bones of the horses or livestock.
- Mold—round bales sitting on the ground retain rain ware from the ground potentially causing mold and mildew within the bale. If the animals eat the mold there is a high risk of health issues. Moldy hay additionally adds to the percentage of waste.
- Feeder replacement—the common round bale feeders sit on the ground and surround the bale to form a cage. They collect water and prevent proper drainage which then in turn rusts and rots the feeder incurring replacement costs more frequently and further mold the hay.

Solution:
- Lowers percent of hay waste
- Lessens chance of rodent infestation
- Promotes proper drainage
- Cost savings
- Ease of loading The round hay bale cradle keeps the hay off the ground allowing for proper water drainage to minimize mold and deters rodents and other nuisance creatures from nesting and burrowing beneath the bale. The upright design keeps water from collecting in and around the metal tubing to help in the prevention of rust, therefore minimizing replacement frequency.

The design of the manger shell structure may have a shallow arch, may have a steep arch or may have a tall arch.

We claim:

1. A manger style hay bale handling apparatus comprising:
    a manger shell structure positioned within a structural frame and pivotably mounted to the structural frame and moveable between a first bale retaining position and a second bale retaining position;
    wherein the manger shell structure (10) comprises a plurality of curved shaped ribs (12) being spaced apart to form a cradle framework providing longitudinal support for a horizontally positioned round hay bale
    a mounting platform for elevating the manger shell structure above ground wherein the mounting platform comprises a pair of parallel spaced apart skids (14);
    a cross member (16) is rotatably connected to the manger shell structure (10) with a fixture (18) that allows the manger shell structure to rotate;
    wherein the cross member (16) is perpendicular to the parallel, spaced apart skids (14);
    wherein the cross member (16) is supported by the parallel, spaced apart skids (14); and a lock for locking the manger shell structure in a fixed position;
    wherein the lock is two rotatable bars (20) attached to the pair of parallel skids (14) and two locking mechanisms (22) attached to the manger shell structure (10).

2. An apparatus according to claim 1, wherein the fixture is permanently affixed to cradle framework of the manger shell.

3. An apparatus according to claim 1 wherein the skids are longitudinal bars.

4. An apparatus according to claim 1 wherein the skids are elongated rods.

5. An apparatus according to claim 1 wherein the manger shell structure has a shallow arch.

6. An apparatus according to claim 1 wherein one locking mechanism (22) engages one bar (20) when manger shell structure (10) is rotated in a forward position.

7. An apparatus according to claim 1 where manger shell structure (10) rotates back to an upright position when bar (20) disengages from locking mechanism (22).

8. An apparatus according to claim 1 further comprising a notch in skid (14) securing rod (20) when manger shell structure (10) is in an unlocked, upright position.

* * * * *